No. 741,488. PATENTED OCT. 13, 1903.
R. M. HALE.
MOLDING APPARATUS.
APPLICATION FILED APR. 4, 1903.
NO MODEL. 5 SHEETS—SHEET 1.
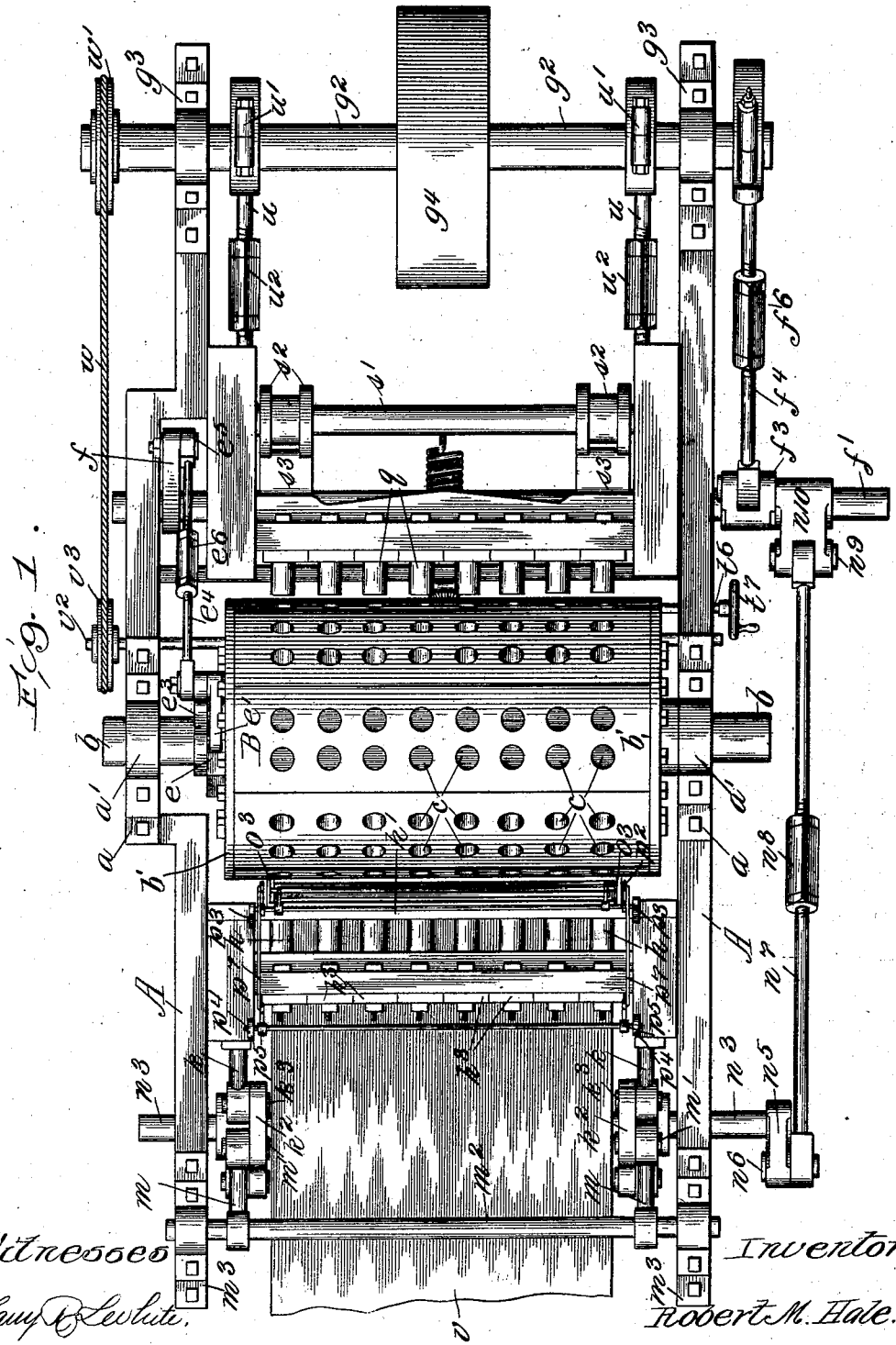
Witnesses
Harry R. Leslie
Ray White
Inventor:
Robert M. Hale
By Howard M. Cox Atty.

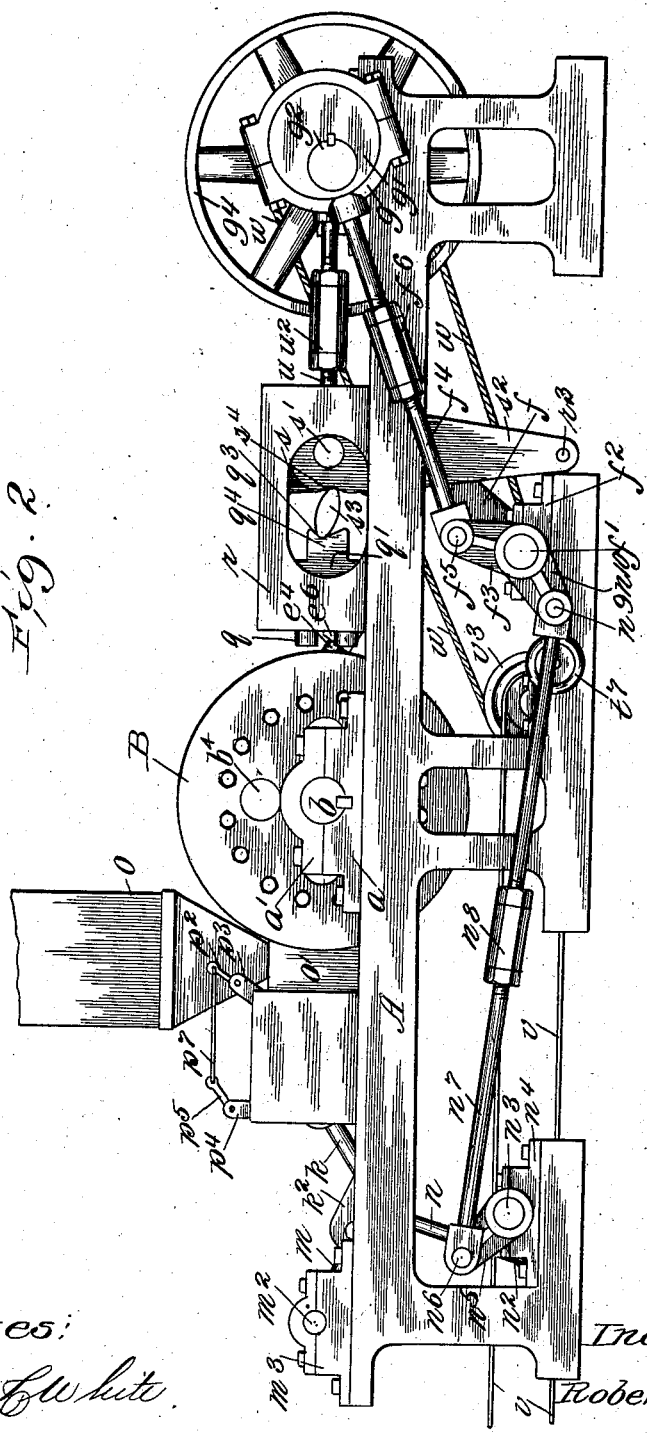

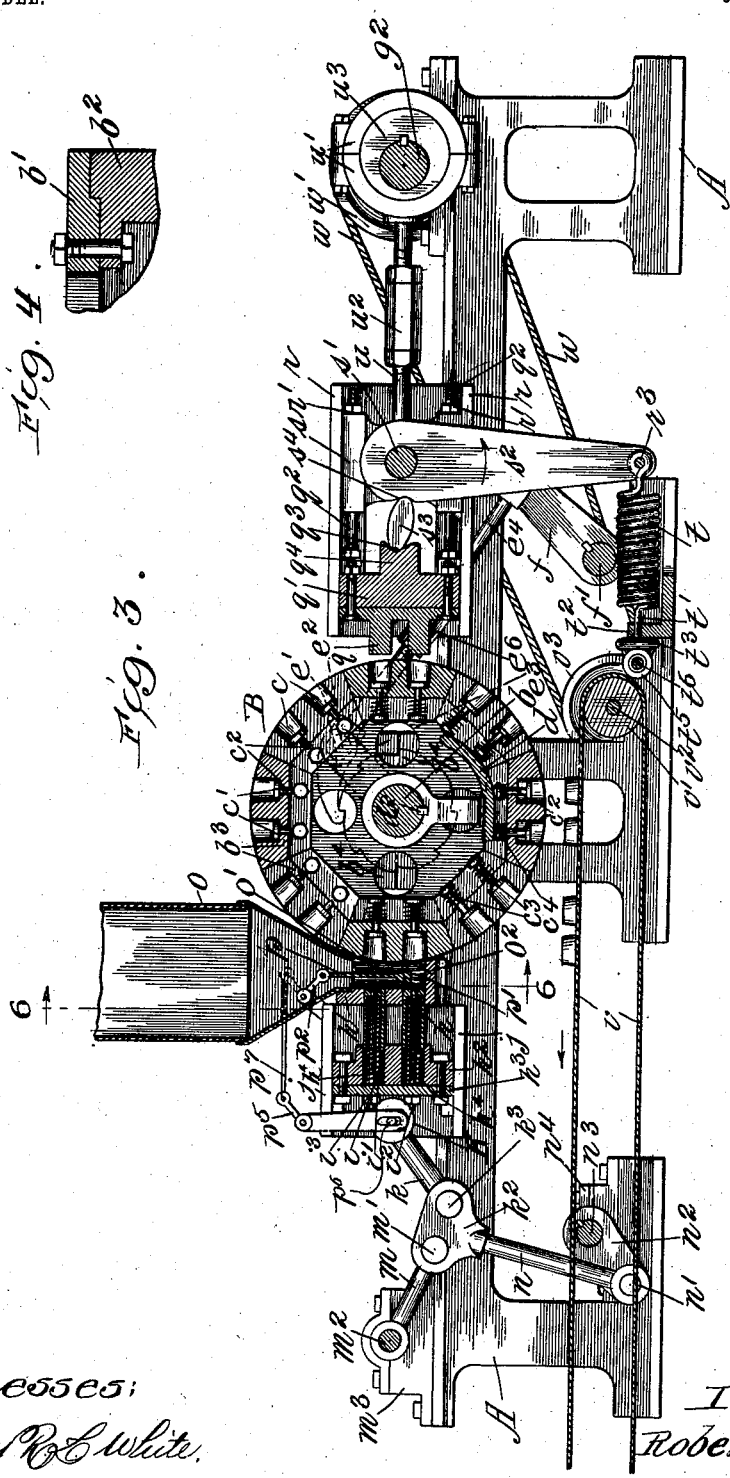

No. 741,488. PATENTED OCT. 13, 1903.
R. M. HALE.
MOLDING APPARATUS.
APPLICATION FILED APR. 4, 1903.
NO MODEL. 5 SHEETS—SHEET 4.
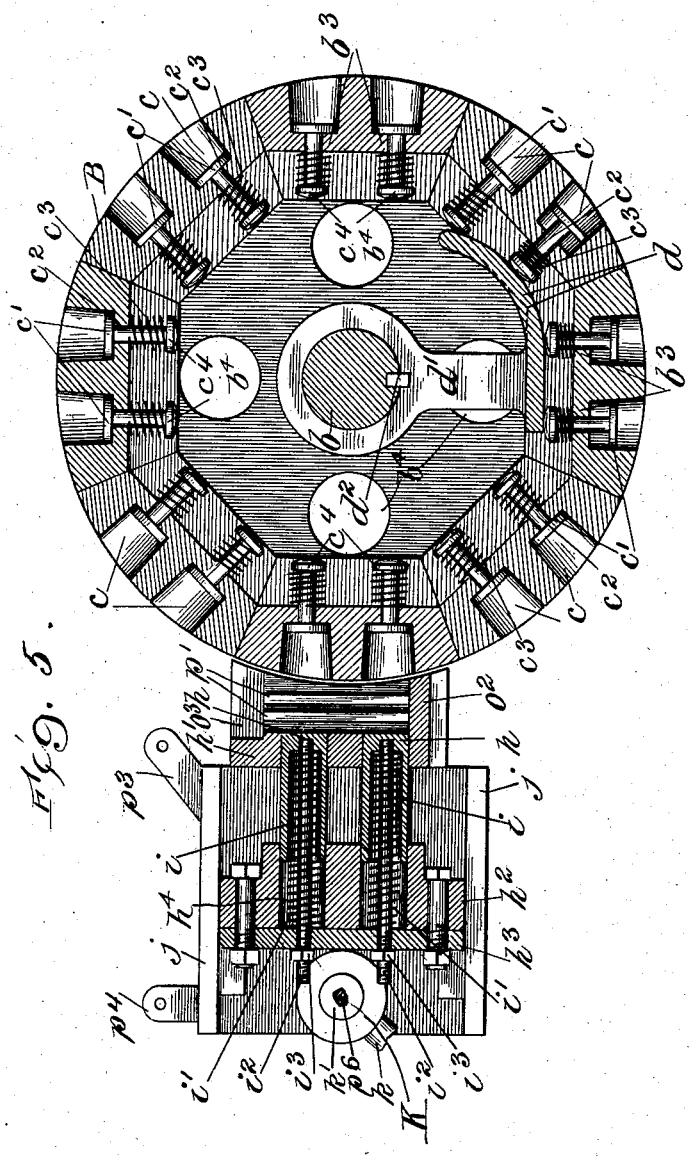
Witnesses:
Inventor:
Robert M. Hale.
By Howard M. Cox
Atty.

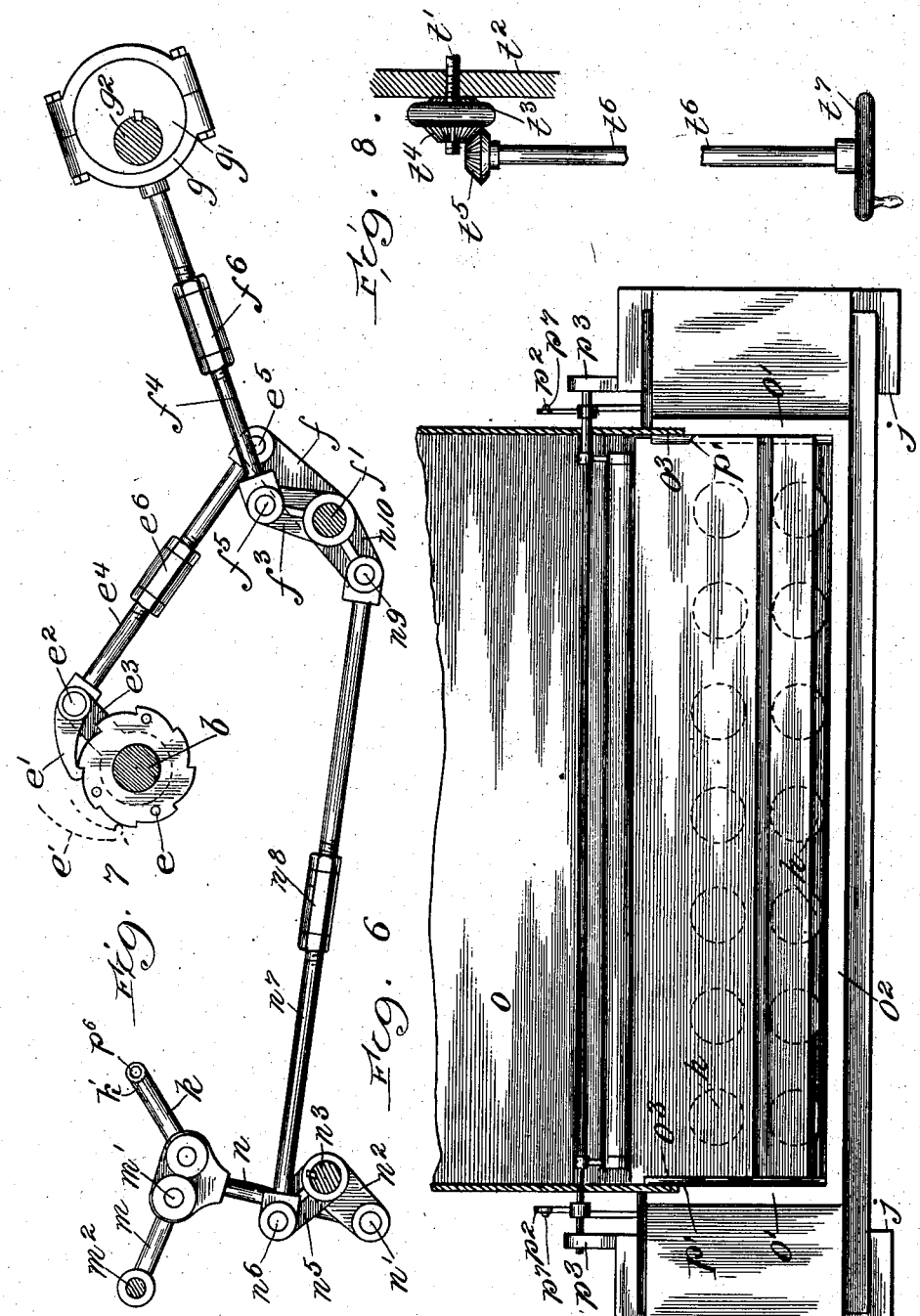

No. 741,488. Patented October 13, 1903.

UNITED STATES PATENT OFFICE.

ROBERT M. HALE, OF CHICAGO, ILLINOIS.

MOLDING APPARATUS.

SPECIFICATION forming part of Letters Patent No. 741,488, dated October 13, 1903.

Application filed April 4, 1903. Serial No. 151,177. (No model.)

*To all whom it may concern:*

Be it known that I, ROBERT M. HALE, a citizen of the United States, residing in the city of Chicago, county of Cook, State of Illinois, have invented a new and useful Improvement in Molding Apparatus, of which the following is a specification.

My invention relates to molding apparatus for compacting cohesive material into any desired form.

My machine may be employed for producing bricks or blocks from clay or other material which is by nature plastic or for producing bricks or blocks from pulverulent ores or flue-dust, it being commonly necessary, however, when working with the last-named materials to employ lime or other adhesive material to act as a bond to hold the particles together and impart sufficient strength to permit subsequent handling. The blocks thus produced from ores and flue-dust are used for smelting and are commonly termed "briquets."

The object of my invention is to produce an apparatus which is simple in construction, of large capacity, powerful in its compressive action, and positive in its operation. It is also my object to reduce the danger of breakage to a minimum. The particular devices by which these different objects are attained are pointed out more specifically in the claims and are illustrated in the accompanying drawings, in which—

Figure 1 is a general plan view of the machine. Fig. 2 is a general side view thereof. Fig. 3 is a side view, in vertical longitudinal section, showing the plungers withdrawn from the molds. Fig. 4 is a fragmentary detail view showing the method of attaching the mold-blocks to the heads of the mold-drum. Fig. 5 is an enlarged view, in vertical longitudinal section, showing the construction of the mold-drum and the primary plungers. Fig. 6 is a sectional view through the hopper on the line 6 6, Fig. 3. Fig. 7 is a side view of the link-and-toggle mechanism for operating the primary plungers and rotating the mold-drum. Fig. 8 is a fragmentary detail view showing the method of adjusting the tension of the safety-spring in the repressing mechanism.

Similar reference characters denote similar parts throughout the several views.

A is the framework of the machine, which forms a support for the various reciprocating and stationary parts thereof.

*Mold-drum.*—B represents the mold-drum, which is loosely mounted, so as to rotate upon the fixed shaft $b$. Said shaft extends transversely across the machine and in the preferred construction is keyed to the pillow-block $a$ and retained therein by means of the pillow-block cap $a'$. The mold-drum is cylindrical and consists of the drum-heads $b'$ and the mold-blocks $b^2$, bolted or otherwise secured together and mounted on shaft $b$ loosely, so as to rotate thereon, but without lateral motion. Said drum-heads have hand-holes $b^4$ for affording access to the interior of the drum. By preference the mold-blocks are eight in number, and the edges thereof are beveled, so that the planes of contact extend radially from the shaft $b$ as a center. Each of said blocks is provided with a series of chambers $c$, which constitute the molds. The bottoms $b^3$ of the molds are formed conveniently by boring only part way through the mold-blocks, so as to leave a portion of the metal remaining. In the present machine each mold-block $b^2$ is provided with two rows of molds, eight molds to a row, consequently giving the machine one hundred and twenty-eight molds in all. Of course the number of mold-blocks may be varied; but in the machine here illustrated sixteen briquets are formed simultaneously, and the machine consequently has a large capacity. The molds are preferably cylindrical with the exception that there is a slight flaring or outward tapering toward the mouth of the molds, so that the mouth of a mold is of slightly greater diameter than the bottom thereof.

The mold-bottoms $b^3$ are apertured to receive the stems $c^2$ of the ejector-plates $c'$. Said plates fit in said molds, so as to be movable up and down therein and form a false bottom thereto. Said ejector-plates $c'$ are normally held in contact with the mold-bottom $b^3$ by means of the springs $c^3$, acting against the heads $c^4$ of the ejector-stems. It is the function of the ejector-plates to force the material out of the molds after it has been compacted, and this is accomplished by means of the cam $d$, which is held stationary in the machine inside of the drum and has a working face against which the heads $c^4$ of the ejector-stems are brought as the drum rotates. The working face of said cam is formed eccentrically, so that the portion thereof first contacted by the ejector-heads is nearest to the axis of the drum. The parts are so proportioned that as the drum revolves beyond the point at which the compressing action has been completed the ejectors will come into contact with the cam $d$ and by reason of the eccentricity of said cam be forced upward toward the mouth of the mold, thus discharging the briquet therefrom. The cam $d$ is attached to the cam-arm $d'$, and said arm is rigidly fixed upon the shaft $b$ by means of the key $d^2$ or any other suitable means.

The mold-drum B is rotated intermittently by means of the ratchet $e$ and dog $e'$. (Shown separately in Fig. 7.) Said ratchet is concentric with the shaft $b$ and is made to rotate with the drum B, the preferred construction being to bolt said ratchet to one of the heads $b'$ of the mold-drum. Said dog $e'$ is pivoted upon the pin $e^2$, mounted upon the rocker-arm $e^3$. Said rocker-arm is loosely mounted, so as to rotate freely upon the shaft $b$, and the parts are so designed that when the pin $e^2$ moves rearward in the direction of the arrow, Fig. 7, the dog $e'$ slips by the teeth of the ratchet $e$ without moving the drum. In its rearward motion the dog $e'$ moves more than one tooth-space on the ratchet $e$—for example, to the dotted position shown in Fig. 7—so that on the forward motion of said dog there is a lost-motion interval before the dog engages a tooth upon said ratchet. During the rearward motion of the dog $e$, as well as during the forward lost-motion interval, the drum B remains still, so that the pressing mechanism is afforded opportunity to operate, as will be hereinafter described. The dog $e'$ is operated by means of the rod $e^4$, which is pivoted to the pin $e^2$ and also to the pin $e^5$, carried in the arm $f$. In order to afford adjustment in the length of the rod $e^4$, the turnbuckle $e^6$ is provided. The arm $f$ is rigidly secured to the rock-shaft $f'$, which is journaled in the bearing $f^2$ in the main frame A. The rock-arm $f^3$ is also rigidly fixed to the shaft $f'$ and is operated by the connecting-rod $f^4$, whereto it is pivoted by means of the pin $f^5$. The remaining extremity of the connecting-rod $f^4$ is attached to the eccentric-strap $g$, which coöperates with the eccentric $g'$, fixed to the main driving-shaft $g^2$. Said shaft is journaled in the bearing $g^3$ in the main frame of the machine and may be rotated by means of the band-wheel $g^4$, as shown.

*Primary pressing mechanism.*—The initial pressure is given to the material in the molds by the primary plungers $h\ h$, which in the present instance are arranged in two horizontal rows one above the other, eight plungers in a row, to correspond to the arrangement of the molds in the drum B. Said plungers are cylindrical to correspond to the form of the molds and are so mounted that their forward portion will slide in the stationary guide $h'$. The rear portion of said plungers is slidingly mounted in the cross-head formed of the parts $h^2$ and $h^3$. Said forward part $h^2$ has the cylindrical apertures $h^4$ therein for slidingly receiving the plungers $h$. The rear part $h^3$ of said cross-head consists of a plate bolted or otherwise secured to said forward part and constitutes a closure for the inner or rear extremities of said apertures.

The plungers $h$ have a counterbore-chamber $i$, which receives the helical spring $i'$. The plunger-stems $i^2$ are inclosed within said springs $i'$ and are rigidly attached at their forward extremity to the forward portion of the plunger $h$. The rear portions of said stems $i^2$ penetrate the cross-head plate $h^3$, but slide loosely in the same. The nut $i^3$ is screwed on the rear threaded portion of the plunger-stem $i^2$ behind the cross-head plate $h^3$. By this arrangement the springs $i'$ tend to force the plungers $h$ forward in the aperture $i$ until the limit is reached, when the nuts $i^3$ come into contact with the cross-head plate $h^3$. By means of said nuts the extreme forward position of the plungers relative to the cross-head may be adjusted.

The cross-head above described reciprocates in the guides $j$, mounted on the main frame A, and is reciprocated backward and forward by means of the front and rear toggle-arms $k$ and $m$, respectively. The forward extremity of the said arm $k$ is pivotally connected to the said cross-head by means of the pin $k'$, which is journaled in the lug K, formed on said cross-head. Said toggle-arm $k$ is pivotally connected to the toggle-center $k^2$ by means of the pin $k^3$. The rear toggle-arm $m$ is pivotally connected to the toggle-center $k^2$ by means of the pin $m'$ and at its rear extremity is pivoted to the shaft $m^2$. Said shaft is fixed in the bearing $m^3$, mounted on the framework A. Said toggle-center is operated by means of the pitman $n$, which is rigidly fixed at one end to said toggle-center and at the other end is pivoted to the rocker-arm $n^2$ by means of the crank-pin $n'$. Said rocker-arm $n^2$ is keyed or otherwise rigidly secured to the rock-shaft $n^3$, which is journaled in the bearings $n^4$ on the framework A. In operation when the rocker-arm $n^2$ is oscillated the pitman $n$ is raised and lowered, thus straightening and flexing the toggle-arms $k$ and $m$, and consequently causing the forward-and-backward movement of the cross-head $h^2\ h^3$ in the guides $j$.

The shaft $n^3$ is rocked by means of the arm $n^5$, which is keyed or otherwise rigidly secured thereto. At the extremity of said arm is the pin $n^6$, which affords pivotal connection to the rod $n^7$. Said rod is provided with a turnbuckle $n^8$, which is connected at its other extremity to the arm $n^{10}$ by means of the pin $n^9$. Said arm $n^{10}$ is keyed or otherwise rigidly secured to the rock-shaft $f'$ above mentioned. Inasmuch as the arms $n^{10}$ and $f$ are both keyed to the same shaft, the proper relative motions of the plungers and drum are assured.

Material is supplied to the mold $c$ through the hopper $o$, which is located above the feeding-chamber $o'$. Said chamber is located between the mold-drum and the plungers $h$, as shown in Fig. 3. The stationary guide $h'$ forms the rear plate of said chamber, while the plate $o^2$ forms the bottom and plates $o^3$ the sides thereof. In order to prevent the material from becoming compacted in the feeding-chamber $o'$, and thereby clogging the same and preventing the complete filling of the molds, the vertically-reciprocating feeder $p$ is arranged to travel up and down in said feeding-chamber and be guided in its motion by means of the guides $p'$ on the side walls $o^3$ of the feeding-chamber, as best shown in Figs. 5 and 6. Said feeder is operated within the feeding-chamber by means of the bell-cranks $p^2$, which are pivotally supported on the lugs $p^3$, formed on the guides $j$, above mentioned. The second pair of lugs $p^4$ are also formed on said guides and constitute pivots for the bell-crank $p^5$. The lower arm of each bell-crank $p^5$ is slotted to receive the pin $p^6$, attached to the inner end of the pins $k'$, above mentioned. The upper arms of said bell-cranks are connected by means of the rod $p^7$, and the parts are so arranged that when the cross-head and plungers move toward the molds the feeder $p$ is raised clear of said plungers; but when said plungers are drawn back into the position shown in Fig. 3 said feeder is lowered into the feeding-chamber, carrying with it the material from above.

*Re-pressing mechanism.*—On the side of the drum opposite to the primary plungers $h$ are the secondary or re-pressing plungers $q$, which correspond in numbers to said primary plungers and are adapted to enter the molds to give a final pressure to the material which is already compacted therein. Said plungers $q$ are bolted or otherwise secured to the auxiliary cross-head $q'$, which slides in the guides $r$. The main re-pressing cross-heads $s$ also slide in said guides $r$ and are connected together by means of the bar $s'$. The cross-head $q'$ is connected to the cross-heads $s$ by means of the tension-rods $q^2$, which are secured at one end to said cross-head $q'$, but at the other end have a sliding bearing in said cross-heads $s$. Nuts $r'$ are screwed onto said rods $q^2$ behind the cross-heads $s$, and as a result when the cross-heads move in a rearward direction away from the drum B the nuts $r'$ are engaged by said cross-heads $s$ and draw said cross-head $q'$ rearwardly; but said rods have no effect to force the cross-head $q'$ toward the mold-drum. Consequently if the plungers $q$ encounter too great resistance the rods $q^2$ merely slide in the cross-heads $s$. The forcing of the plungers $q$ toward the mold is accomplished by means of the safety-levers $s^2$ and safety-blocks $s^3$, said levers being pivotally mounted on the cross-bar $s'$. Said blocks are round at their ends and are designed to fit in the shallow recesses $s^4$, formed in the levers $s^2$, and the shallow recesses $q^3$, formed in the lug $q^4$ on the auxiliary cross-head $q'$. Said recesses $s^4$ and $q^3$ are slightly out of line with each other, so that when the bar $s'$ moves to force the plungers in the mold in the manner hereinafter described the resistance of the plungers $q$ will tend to rotate the safety-levers $s^2$ in the direction of the arrow on said levers, Fig. 3. The rod $r^3$ joins the lower extremities of the levers $s^2$ and serves as a point of attachment for the helical tension-spring $t$ near the center of the machine. The extremity $t'$ of said spring is carried through a suitable aperture in the cross-frame $t^2$ and is threaded to receive the adjusting-nut $t^3$ on the opposite side of said cross-frame. In order to conveniently operate said nut $t^3$ from the outside of the machine-frame, said nut is provided with a miter-gear $t^4$, which is engaged by the miter-gear $t^5$ on the rod $t^6$, as best shown in Fig. 8. Said rod $t^6$ is carried to the side of the machine-frame, where it is provided with a hand-wheel $t^7$. By this mechanism the rotation of said hand-wheel $t^7$ will control the position of the spring extremity $t'$ in the cross-frame $t^2$, thereby regulating the tension of the spring $t$.

The bar $s'$ is reciprocated backward and forward in the guides $r$ by means of the connecting-rod $u$, which is pivoted at one end in said bar and is rigidly connected at the other end to the eccentric-strap $u'$. The turnbuckle $u^2$ is provided in said connecting-rod to allow a forward adjustment in the operative length thereof. The eccentric-strap $u'$ works upon the eccentric $u^3$, which is keyed or otherwise rigidly secured to the main driving-shaft $g^2$. The rotation of the shaft $g^2$ causes the reciprocation of the main re-pressing cross-heads $s$ and the auxiliary re-pressing cross-head $q'$ and plungers $q$.

As above stated, the safety-blocks $s^3$ are slightly oblique to the line of force in which the bar $s'$ acts in forcing the plungers $q$ into the molds. Consequently during compression there is a tendency for said blocks to rotate the levers $s^2$ about the bar $s'$ as a fulcrum. The parts are so arranged that the direction of such rotation is such as to elongate the spring $t$ against the tensional resistance thereof, this direction being indicated by the arrow on said lever, Fig. 3. If the resistance encountered by the plungers $q$ becomes too great and the levers $s^2$ are swung too far out of normal, the safety-blocks $s^3$ will slip out of the recesses $s^4$, which engage them, and will drop out of position, so as to be inoperative in the transmission of force to the cross-head $q'$. Under these circumstances the rods $q^2$ slide in the cross-heads $s$, and so exert no pressure on said cross-head $q'$. By regulating the tension of the spring $t$ by means of the above-described mechanism provided for the purpose the parts may be so adjusted that a definite amount of pressure may be given to the material in the mold, and any pressure in excess of the amount desired will be absorbed by the spring $t$. In practice the parts are so arranged that it is only when an unusual resistance is encountered by the plungers—as, for example, when the latter fail to register with the mold—that the safety-levers $s^2$ are thrown to such an extent as to actually displace the safety-blocks $s^3$.

In order to carry away the blocks or briquets as they are discharged from the machine, a carrier belt or conveyer $v$ is provided and leads over the drum $v'$ on the shaft $v^2$. Said shaft $v^2$ is suitably mounted in the lower portion of the machine in such a position that the conveyer passes beneath the mold-drum B. The shaft $v^2$ is rotated preferably by means of the sheave $v^3$ thereon, said sheave being driven by means of the rope or belt $w$, which trains over said sheave $v^3$ and also over the sheave $w'$, secured to the main driving-shaft $g^2$.

In the operation of the machine the material to be compressed is supplied through the hopper $o$ to the feed-chamber $o'$, and said material is agitated in said feed-chamber by means of the feeder $p$, so that the primary plungers $h$ may at all times have sufficient material to completely fill the molds. Starting with the machine in the position shown in Fig. 3, the rotation of the shaft $g^2$ causes the toggles $k$ and $m$ to straighten and move the plungers $h$ toward the mold-drum and at the same time causes the feeder $p$ to quickly rise clear of said plungers. When the toggles are straight, the plungers $h$ reach the forward limit of their travel and force material from the feed-chamber into the molds. The pitman $n$ continues its rising motion until the toggles are flexed in an upward direction and the plungers are again retracted. With the retraction of the plungers the feeder $p$ descends into the feed-chamber $o'$, carrying with it a fresh supply of material. As soon as the plungers $h$ have reached the rearward limit of their travel the arm $n^2$ causes the motion of the pitman to be reversed, thus lowering the toggle-center $k^2$ and again straightening the toggles. During both the upward and return movement of the pitman $n$ the drum B remains stationary, so that the forward motion of the plungers due to the downward straightening of the toggles causes a fresh charge of material to be introduced into the same molds which have been partially filled on the upward flexing of said toggles. The pitman $n$ continues its downward motion until the toggles are again flexed downward and the plungers $h$ again reach the retracted position shown in Fig. 3. By thus arranging the parts so that the mold-drum B remains stationary during two complete forward strokes of the plungers the molds are not only well filled, but the material is well compacted therein by reason of the two separate pressing actions to which the material is subjected. The material is acted upon a part at a time, and therefore the material first introduced and occupying the bottom of the mold is as well compacted as the material at the top of the mold. If the resistance of the material has become too great as it is being forced into the molds, the springs $i'$ yield, and thus prevent undue strain upon the machine. While the molds are thus being filled, the dog $e'$ is moved forward in a direction opposite to the direction of the arrow, Fig. 7, so that by the time the plungers have finally left the molds the drum B will rotate sufficiently to bring the next set of molds in a position to receive the plungers $h$. The drum B rotates in such a direction that the filled molds move upward and over toward the secondary plungers $q$. The plungers $q$ and other parts of the re-pressing mechanism are so constructed that the motion of the said secondary plungers toward the mold-drum will take place while said drum is stationary and the primary plungers $h$ are filling the molds. The re-pressing mechanism gives a final pressure to the material in the molds after the mold-drum has made half of a complete revolution. This period of time intervening between the first pressing and the re-pressing of the material is of special advantage when the machine is operated upon materials whose particles do not quickly and readily adjust themselves during compression. As a considerable interval of time occurs in my machine between the first pressing and the re-pressing, an opportunity is afforded to the particles to become mutually adjusted, the material consequently becoming more susceptible to the re-pressing action of the plungers $q$. The re-pressing plungers make but a single forward movement for each set of molds as presented; but the pressure exerted is great, and this slow high pressure gives great solidity to the finished product. As the drum rotates to advance any given set of molds beyond the re-pressing plungers $q$ the stems $c^2$ of the ejectors are brought into contact with the fixed cam $d$. As a result the ejector-plates are forced outward toward the mouth of the molds, and by the time the said given set of molds has reached a position at the under side of the drum the blocks or briquets will be discharged onto the conveyer-belt $v$ and carried away, as illustrated in Fig. 3.

Inasmuch as the plungers $h$ and $q$ act in opposite directions, the shaft $b$ is relieved of much of the strain due to the pressing of the material into the molds.

It is evident that in matters of mere construction and arrangement of the parts many changes may be made without departing from the spirit of my invention.

What I claim as new, and desire to secure by Letters Patent, is—

1. In a molding apparatus, the combination of a cylindrical drum rotatable about a horizontal axis and having molds in its cylindrical surface; a reciprocatory cross-head; plungers in said cross-head; a stationary feed-chamber interposed between said plungers and said mold-drum; a feeder traveling in said feed-chamber; and means operated by said cross-head for operating said feeder.

2. In a molding apparatus, the combination of a rotatable cylindrical mold-drum, a reciprocating cross-head movable toward and from said drum, plungers mounted in said cross-head, a stationary feed-chamber interposed between said plungers and said mold-drum, a feeder working in said feed-chamber, and a link-and-lever device operated by said cross-head for operating said feeder.

3. In a molding apparatus, the combination of a horizontal shaft; a cylindrical mold-drum loosely mounted thereon; molds in the cylindrical surface of said drum; means for introducing material into said molds; a ratchet on said drum; a rocker-arm loosely pivoted on said shaft; means for operating said rocker-arm; and a dog pivoted on said rocker-arm for operating said ratchet, said dog in its rearward motion moving more than one tooth-space on said ratchet whereby there is a lost-motion interval on the forward motion of said dog in addition to the lost motion during the rearward motion of said dog on said ratchet.

4. In a molding apparatus, the combination of a horizontal shaft, a drum mounted on said shaft, molds in said drum, plungers for filling said molds, a toggle mechanism for operating said plungers, a dog-and-ratchet device for intermittently rotating said drum, a rock-shaft $f'$, connections between said shaft and said toggle mechanism for operating the latter, and other means for connecting said rock-shaft with said ratchet-and-dog device for operating the same.

5. In a molding apparatus, the combination of a mold-drum rotating about a horizontal axis; plungers for compressing material in said mold; a main driving-shaft, a rock-shaft as $f'$, and three rocker-arms secured to said rock-shaft, one of said rocker-arms receiving motion from the main driving-shaft to operate said rock-shaft, the second one of said arms having connections to said drum to rotate the same, and the third one of said arms having connections to said plungers for operating the same, substantially as described.

ROBERT M. HALE.

Witnesses:
JULIA M. BRISTOL,
HOWARD M. COX.